United States Patent [19]
Hanada et al.

[11] Patent Number: 6,117,552
[45] Date of Patent: Sep. 12, 2000

[54] INK-JET RECORDING SHEET AND COATING FORMULATION FOR THE PRODUCTION OF THE SHEET

[75] Inventors: Kazuyuki Hanada; Motoaki Umezu; Kenichi Takahashi; Katsutoshi Torii; Takeshi Kawaguchi; Katsuyuki Fukui, all of Tokyo, Japan

[73] Assignees: Dainichiseika Color & Chemicals Mfg. Co., Ltd.; Ukima Colour & Chemicals Mfg. Co., Ltd, both of Tokyo, Japan

[21] Appl. No.: 09/084,310

[22] Filed: May 26, 1998

[30] Foreign Application Priority Data

Jan. 13, 1998 [JP] Japan .................................. 10-016413
Jan. 13, 1998 [JP] Japan .................................. 10-016414
Jan. 13, 1998 [JP] Japan .................................. 10-016415

[51] Int. Cl.$^7$ ........................................................ B32B 9/04
[52] U.S. Cl. ........................ 428/411.1; 428/195; 428/323; 428/327; 428/423.1; 428/500; 523/160; 524/268; 524/269
[58] Field of Search ................................ 428/41.8, 42.1, 428/145, 195, 211, 212, 343, 352, 354, 323, 327, 411.1, 423.1, 500; 523/160; 524/268, 269

[56] References Cited

U.S. PATENT DOCUMENTS 5,384,365  1/1995  Hanada et al. .......................... 525/105
5,882,755  3/1999  Igarashi et al. ........................ 428/41.8

FOREIGN PATENT DOCUMENTS 92052786  8/1992  Japan ................................ B41M 5/00
10007828  1/1998  Japan ................................ B05D 5/04

Primary Examiner—Bruce H. Hess
Assistant Examiner—Michael E. Grendzynski
Attorney, Agent, or Firm—Oblon, Spivak, McClelland, Maier & Neustadt, P.C.

[57] ABSTRACT

An ink-jet recording sheet is provided with at least one ink-receiving layer on at least one side of a base material sheet. A resin component which constitutes the ink-receiving layer comprises a hydrophilic resin containing hydrolyzable silyl groups in a molecule thereof, a hydrophilic resin containing hydrolyzable silyl groups and tertiary amino groups in a molecule thereof, or a hydrophilic resin containing hydrolyzable silyl groups, tertiary amino groups and polysiloxane segments in a molecule thereof. A coating formulation suitable in use for the production of the ink-jet recording sheet is also disclosed.

25 Claims, No Drawings

INK-JET RECORDING SHEET AND COATING FORMULATION FOR THE PRODUCTION OF THE SHEET

BACKGROUND OF THE INVENTION a) Field of the Invention

This invention relates to an ink-jet recording sheet (hereinafter simply called "a recording sheet"), and more specifically to a recording sheet having an ink receiving layer - which imparts excellent water-proofness and moisture resistance to printed characters, pictures, patterns or the like (hereinafter collectively called "printed marks" for the sake of brevity), is excellent in ink absorbency and ink-color-producing ability, provides stable printed marks of high quality, and is also outstanding in the transportability and blocking resistance inside a printer—and also to a coating formulation for producing the sheet.

b) Description of the Related Art

Ink-jet recording is to perform recording of an image, characters or the like by causing tiny droplets of an ink to fly and stick on a recording sheet made of paper or the like. Various operation principles have been proposed including, for example, the electrostatic attraction method, the method that mechanical vibrations or displacements are applied to an ink by means of a piezoelectric element, and the method that an ink is heated to bubble and the resulting pressure is used. As a recording method which permits high-speed recording, produces less noise and enables high-quality printing and multicolor printing, ink-jet recording is finding ever-increasing utility for various applications.

For use in such ink-jet recording, various recording sheets have been proposed, including recording sheets provided on paper or like bases with ink-receiving layers, which are composed primarily of various pigments and resins, or recording sheets containing porous pigments incorporated in themselves upon making paper so that prompt absorption of ink and formation of well-defined ink dots can be assured without a reduction in print quality due to blotting and/or bleeding of the ink adhered on the recording sheets.

For example, JP Kokai No. 57-82085 discloses a recording sheet which has an ink-receiving layer composed of a water-soluble resin and containing an inorganic pigment and an organic pigment, and JP Kokai No. 62-268682 discloses a recording layer which carries an ink-receiving layer composed of a silanol-containing polyvinyl alcohol copolymer and containing fine powdery silica.

However, keeping the step with improvements in the performance of ink-jet recording machines, such as high-speed recording, high-density recording and full-color recording, and the resulting expansion of their application fields, it has also become necessary for recording sheets to have high-level characteristics such as:

(1) Prompt ink absorption and large ink absorption capacity.

(2) High color-producing ability for inks.

(3) High surface strength on the ink-receiving layer.

(4) High waterproofness of the base material so that the base material will not develop roughness or curling by adhered ink.

(5) Good mark storability, such as waterproofness and ozone resistance, after printing of marks on the ink-receiving layer.

(6) No quality changes of the ink-receiving layer along the passage of time.

To meet these requirements, it has been proposed or studied to use a porous pigment or water-soluble polymer having excellent ink absorbency as a component of an ink-receiving layer to be placed on a recording sheet, to use a latex for an improvement in the water-proofness of an ink-receiving layer, and to use as a base material itself a synthetic paper sheet, plastic sheet or the like equipped with waterproofness.

However, those making use of paper as a base material or a water-soluble resin alone as an ink-receiving layer have poor waterproofness at their ink-receiving layers, leading to a drawback in that blotting takes place at parts printed with ink and marks so formed are hence inferior in definition. On the other hand, recording sheets making use of a synthetic paper sheet or plastic film as a base material and those making use of a latex as a resin for the formation of an ink-receiving layer involve problems in the adhesion between the ink-receiving layer and the base material, the ink absorbency of the ink-receiving layer and the drying property of applied ink.

To improve the waterproofness and moisture resistance of printed images of a recording sheet, it has been the general practice to arrange a protective layer over an ink-receiving layer or to add a mordant or the like in an ink-receiving layer. As a method for the arrangement of a protective layer, a hydrophobic resin may be coated or a film may be laminated over an ink-receiving layer after printing images thereon. Although such a method can bring about improvements in waterproofness and moisture resistance, it requires many steps and therefore is not preferred for the formation of images from the standpoint of price.

Concerning the method which features the addition of a mordant or the like in an ink-receiving layer, dyes employed in ink-jet color inks are direct dyes or acid dyes, the molecule of each of which contains an anionic carboxyl or sulfonic group. To improve the waterproofness and fixability of images formed with these dyes, a cationic mordant or the like is added to an ink-receiving layer. The bonding between the mordant and its associated dye is however ionic bonding, which is prone to dissociation in the present of water. A limitation is therefore imposed on the waterproofness and moisture resistance of images so formed.

SUMMARY OF THE INVENTION

With a view to solving such problems of the conventional recording sheets as described above and developing a recording sheet which is excellent in the waterproofness and moisture resistance of printed marks to be formed, is superb in ink absorbency and ink-color-producing ability, provides stable printed marks of high quality, and is also outstanding in the transportability and blocking resistance inside a printer, the present inventors have proceeded with a variety of investigations. As a result, it has been found the above object can be achieved by forming an ink-receiving layer of a recording sheet with a particular hydrophilic resin, leading to the completion of the present invention.

Accordingly, there is provided, in one aspect of the present invention, a recording sheet provided with at least one ink-receiving layer on at least one side of a base material sheet, wherein a resin component which constitutes the ink-receiving layer comprises a hydrophilic resin containing hydrolyzable silyl groups in a molecule thereof (hereinafter called "the first resin"). In a second aspect of the present invention, there is also provided a recording sheet making use of a hydrophilic resin containing hydrolyzable silyl groups and tertiary amino groups in a molecule thereof (hereinafter called "the second resin") instead of the first resin in the first aspect of the present invention. In a third aspect of the present invention, there is also provided a recording sheet making use of a hydrophilic resin containing hydrolyzable silyl groups, tertiary amino groups and polysiloxane segments in a molecule thereof (hereinafter called "the third resin") in place of the first resin in the first aspect of the present invention.

DETAILED DESCRIPTION OF THE INVENTION AND PREFERRED EMBODIMENTS

The present invention will next be described in further detail by describing certain preferred embodiments.

The recording sheet according to the first aspect of the present invention is characterized in that the at least one ink-receiving layer arranged on the at least one side of the base material sheet is formed of the first resin. The recording sheet according to the second aspect of the present invention is characterized in that the at least one ink-receiving layer arranged on the at least one side of the base material sheet is formed of the second resin. The recording sheet according to the third aspect of the present invention is; characterized in that the at least one ink-receiving layer arranged on the at least one side of the base material sheet is formed of the third resin.

The term "hydrophilic resin" as used herein means a polymer which is insoluble in water, warm water or the like although it contains hydrophilic groups in its molecule. The hydrophilic resin should therefore be distinguished from water-soluble resins such as polyvinyl alcohol, polyvinyl pyrrolidone and cellulose derivatives.

[First Aspect of the Present Invention]

In the first aspect of the present invention, it is believed that, owing to the use of the first resin as the resin component for the formation of the ink-receiving layer, the crosslinking of the resin with water improves the fixability of a dye and the water-proofness of the ink-receiving layer and also improves the surface strength, blocking resistance and printer transportability of the ink-receiving layer, as indicated by the following formula (I) and/or formula (II.).

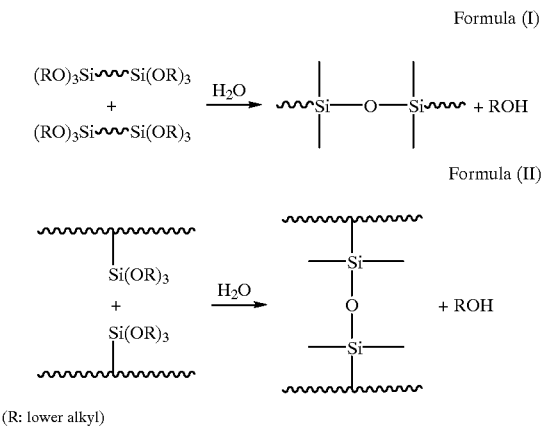

(R: lower alkyl)

The crosslinking of the resin component in the ink-receiving layer is induced by water. No particular limitation is imposed on the supply of water for the crosslinking. Water can be added upon formation of the ink-receiving layer. Because the resin making up the ink-receiving layer is hydrophilic, moisture which is absorbed in the ink-receiving layer can be used as an alternative. Upon printing, water which is contained in a water-based ink can be used as a further alternative. Since the crosslinking takes place as a result of conversion of hydrolyzable silyl groups into silanol groups by water and subsequent condensation of the silanol groups as described above, it is preferred to incorporate a catalyst beforehand in an ink-receiving layer so that the condensation of silanol groups can be promoted. As such a catalyst, a tin carboxylate or the like, an acidic catalyst or a basic catalyst is preferred. It can be used preferably in a range of from 0.0001 to 10 wt. % based on the hydrophilic resin.

No particular limitation is imposed on the hydrophilic resin as the first resin making up the ink-receiving layer in the present invention, insofar as it is a hydrophilic resin containing hydrolyzable silyl groups at any positions. From the standpoint of introduction of such groups, at least one hydrophilic resin selected from hydrophilic polyurethane resins, hydrophilic polyurea resins and hydrophilic polyurethane-polyurea resins is preferred.

As a method for introducing hydrolyzable silyl groups into a hydrophilic resin, a silane coupling agent with a reactive group and a hydrolyzable group reaction contained therein or a reaction product between the silane coupling agent and an organic polyisocyanate can be used as a portion of a raw material for the synthesis of the hydrophilic resin or can be reacted with reactive groups contained in the ends and/or side chains of molecules of the hydrophilic resin. Representative examples of the hydrolyzable group or groups in the hydrolyzable silyl group or groups of the silane coupling agent can include alkoxy groups such as methoxy, ethoxy, and methoxyethoxy. Needless to say, other hydrolyzable groups can also be used.

Examples of the above-described silane coupling agents, each of which is usable in the present invention and contains one or more reactive groups and one or more hydrolyzable groups, can include the following compounds:

(1) Silane coupling agents containing at least one free isocyanate group and represented by the following formula (1):

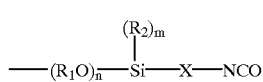

(1)

wherein $R_1$ represents a lower alkyl group, $R_2$ represents a lower alkyl group or a lower alkoxy group, X represents a divalent organic group, preferably a $C_0$–$C_{50}$ alkylene, aromatic or aliphatic group, two of $R_1$, $R_2$ and X may be coupled together via a connecting group such as —N—, —O—, —CO—, —COO—, —NHCO—, —S—, —SO— or —$SO_2$—, m stands for an integer of from 0 to 2, and n stands for an integer of 3 minus m, with the proviso that m plus n is equal to 3.

Preferred specific examples of the above-described free-isocyanate-group-containing silane coupling agents can include the following compounds:

$(CH_3O)_3Si(CH_2)_3NCO$ $(C_2H_5O)_3Si(CH_2)_3NCO$

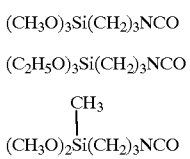

-continued $(C_2H_5O)_2\overset{\underset{\displaystyle CH_3}{|}}{Si}(CH_2)_3NCO$ $(CH_3O)_3SiNCO$ $(CH_3O)_2Si(NCO)_2$ $(C_2H_5O)Si(NCO)_3$ $(CH_3O)Si(NCO)_3$ (2) Silane coupling agents, each of which is a reaction product between a silane coupling agent containing one or more reactive groups and an organic polyisocyanate, said reaction product containing at least one free isocyanate group in its molecule.

Examples of the silane coupling agent, which contains one or more reactive groups and is usable in the above reaction, can include those represented by the following formula (2):

$$(R_1O)_{\overline{n}}\overset{\underset{\displaystyle (R_2)_m}{|}}{Si}-X-YH \qquad (2)$$

wherein Y represents —NH—, —NR$_3$—, —O— or —S—, R$_1$, R$_2$, X, m and n have the same meanings as defined above, and R$_3$ represents a lower alkyl group.

Preferred specific examples of the above-described reactive-group-containing silane coupling agents can include the following compounds:

$(CH_3O)_2\overset{\underset{\displaystyle CH_3}{|}}{Si}(CH_2)_3NH(CH_2)_2NH_2$ $(C_2H_5O)_2\overset{\underset{\displaystyle CH_3}{|}}{Si}(CH_2)_3NH(CH_2)_2NH_2$ $(CH_3O)_3Si(CH_2)_3NH(CH_2)_2NH_2$ $(C_2H_5O)_3Si(CH_2)_3NH(CH_2)_2NH_2$ $(CH_3O)_3Si(CH_2)_3NH_2$ $(C_2H_5O)_3Si(CH_2)_3NH_2$

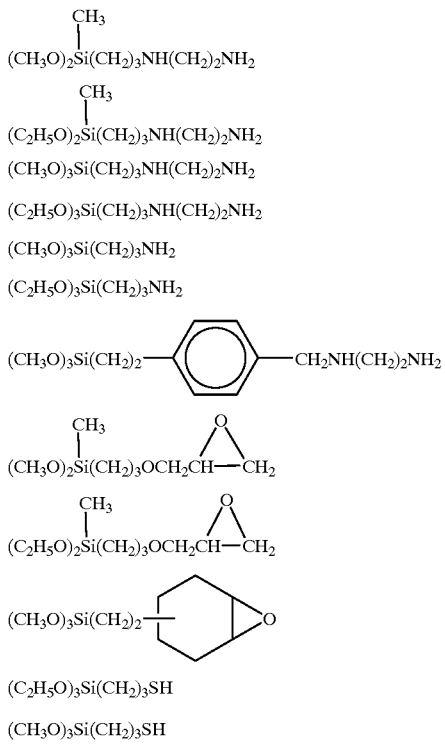

$(C_2H_5O)_3Si(CH_2)_3SH$ $(CH_3O)_3Si(CH_2)_3SH$

The above silane coupling agents are illustrative examples of silane coupling agents preferable for use in the present invention, and the present invention should not be limited to the use of these exemplified coupling agents. In the present invention, it is therefore possible to use not only the above-exemplified compounds but also other known silane coupling agents currently sold on the market and readily available from the market.

Illustrative methods for introducing hydrolyzable silyl groups into the ends and/or side chains of the molecule of the hydrophilic resin by using the above-described silane coupling agent can be illustrated as will be shown next.

(1) Introduction into the ends of the molecule

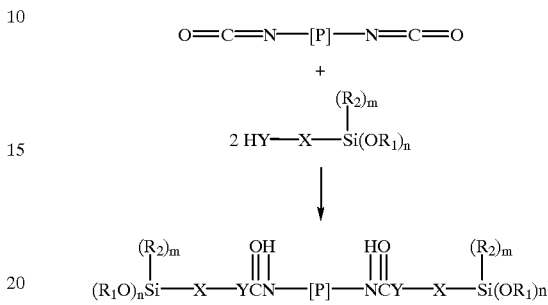

wherein R$_1$, R$_2$, X, Y, m and n have the same meanings as defined above, and [P] represents a hydrophilic polyurethane, hydrophilic polyurea or hydrophilic polyurethane-polyurea containing at least two urethane bonds and/or urea bonds per molecule.

(2) Introduction into side chains of the molecule

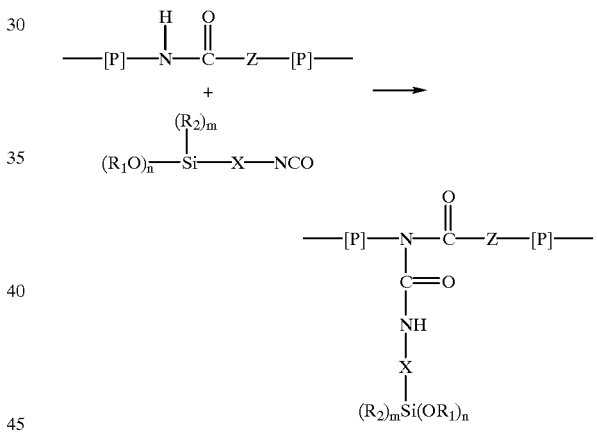

wherein Z represents —O—, —S—, —NR$_3$— or —NH—, and R$_1$, R$_2$, R$_3$, [P], m and n have the same meanings as defined above.

Hydrolyzable silyl groups can also be introduced into the ends and/or side chains of the molecule of the hydrophilic resin by methods other than the above-described ones, so that the introducing method is of course not limited to the above-described examples.

In the above-described reactions, the hydrophilic resin, especially the preferred hydrophilic polyurethane resin, hydrophilic polyurea resin or hydrophilic polyurethane-polyurea resins, into the ends and/or side chains of the molecule of which hydrolyzable silyl groups are introduced, can be obtained following a conventionally known synthesis (polymerization) process of the resin. No particular limitation should therefore be imposed on the synthesis processes and raw material components of these resins.

[Second Aspect of the Present Invention]

In the second aspect of the present invention, the above-described second resin is used. It is believed that, in this second resin, ionic bonds are formed between molecules of a dye and the resin owing to the tertiary amino groups introduced in the resin molecules, resulting in improvements in the fixability of the dye and the waterproofness of marks to be formed.

Taking into consideration that the bonding between the dye and the tertiary amino groups is ionic bonding as in the conventional cases which use a mordant in ink-receiving layers, it is not certain why the marks so formed are equipped with such improved water-proofness over those available by the conventional art. It is however presumed that the resins useful in the present invention are hydrophilic but are water-insoluble and accordingly, that their molecules also contain hydrophobic segments in abundance. Subsequent to the formation of ionic bonds between the tertiary amino groups in the resins and the dye, the hydrophobic segments appear to surround these ionic bonds so that the thus-formed marks are provided with the improved waterproofness over the prior art.

Different from the conventional art making use of a mordant, it is believed that, while the tertiary amino groups in resin molecules in the present invention are progressively forming ionic bonds with the dye, the hydrophobic segments in the resin molecules act to surround these ionic bonds and that this action is attributable to the improved waterproofness of the thus-formed marks.

As a method for introducing tertiary amino groups into the resin by adding the above-described hydrolyzable silyl groups in the present invention, it can be mentioned (a) to use, as a portion of a raw material for the synthesis (polymerization) of the second resin, a compound containing one or more reactive groups, for example, amino, epoxy, hydroxyl, mercapto, carboxyl, alkoxy, acid halide, carboxyl ester, acid anhydride, unsaturated carbon-carbon or like groups in its molecule and also one or more tertiary amino groups in the molecule or (b) to react the above-mentioned compound with the reactive groups in the first resin.

Preferred examples of tertiary amino-containing compounds having such reactive group(s) therein can include compounds represented by the following formulas (3)–(5), respectively.

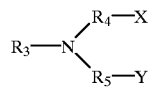

(3)

wherein $R_3$ represents an alkyl group having 20 or fewer carbon atoms, an alicyclic group, or an aromatic group which may contain one or more substituents such as halogen atoms or alkyl groups; $R_4$ and $R_5$ may be the same or different and individually represent lower alkylene groups or lower alkylene groups each of which contains therein a connecting group such as —O—, —CO—, —COO—, —NHCO—, —S—, —SO— or —SO$_2$—; and X and Y may be the same or different and individually represent —OHs, —COOHs, —NH$_2$s, —NHR$_3$s, —SHs or the like or epoxy, alkoxy, acid halide, acid anhydride or carboxyl ester groups which can be converted into —OHs, —COOHs, —NH$_2$s, —NHR$_3$s, —SHs or the like.

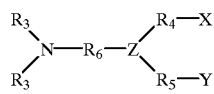

(4)

wherein $R_3$s, $R_4$, $R_5$, X and Y have the same meanings as defined above, and the two $R_3$s may together form a cyclic structure; $R_6$ represents —(CH$_2$)n—, n being an integer of from 0 to 20, or is the same as $R_4$ or $R_5$; and Z represents CH or N.

X—W—Y (5)

wherein X and Y have the same meanings as defined above; and W represents a nitrogen-containing hetero-cyclic group, a nitrogen- and oxygen-containing hetero-cyclic group, or a nitrogen- and sulfur-containing heterocyclic group.

Specific examples of compounds represented by the above formulas (3), (4) and (5) can include:
N,N-dihydroxyethyl-methylamine,
N,N-dihydroxyethyl-ethylamine,
N,N-dihydroxyethyl-isopropylamine,
N,N-dihydroxyethyl-n-butylamine,
N,N-dihydroxyethyl-t-butylamine,
methyliminobispropylamine,
N,N-dihydroxyethylaniline,
N,N-dihydroxyethyl-m-toluidine,
N,N-dihydroxyethyl-p-toluidine,
N,N-dihydroxyethyl-m-chloroaniline,
N,N-dihydroxyethylbenzylamine,
N,N-dimethyl-N',N'-dihydroxyethyl-1,3-diaminopropane,
N,N-diethyl-N',N'-dihydroxyethyl-1,3-diaminopropane,
N-hydroxyethyl-piperazine,
N,N'-dihydroxyethyl-piperazine,
N-hydroxyethoxyethyl-piperazine,
1,4-bisaminopropyl-piperazine,
N-aminopropyl-piperazine,
dipicolinic acid,
2,3-diaminopyridine,
2,5-diaminopyridine,
2,6-diaminopyridine,
2,6-diamino-4-methylpyridine,
2,6-dihydroxypyridine,
2,6-pyridine-dimethanol,
2-(4-pyridyl)-4,6-dihydroxypyrimidine,
2,6-diaminotriazine,
2,5-diaminotriazole, and
2,5-diaminooxazole.

Ethylene oxide adducts, propylene oxide adducts and the like of these tertiary amino compounds are also usable in the present invention. Illustrative of such adducts can be the following compounds:

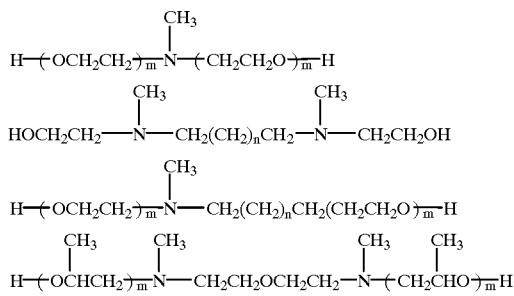

-continued

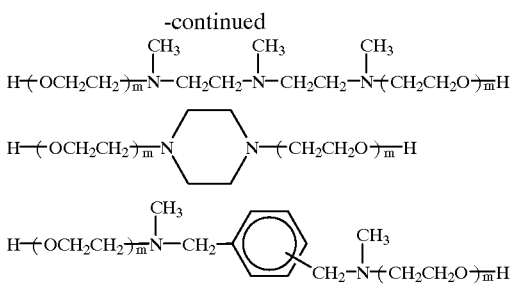

wherein m stands for an integer of from 1 to 60, and n stands for an integer of from 1 to 6.

In the present invention, the second resin, especially the preferred hydrophilic polyurethane resin, hydrophilic polyurea resin or hydrophilic polyurethane-polyurea resins can be obtained following a conventionally known synthesis (polymerization) process of the resin. No particular limitation should therefore be imposed on the synthesis processes and raw material components of these resins.

[Third Aspect of the Present Invention]

In the third aspect of the present invention, on the other hand, the third resin obtained available by introducing polysiloxane segments into the above-described second resin is used. In this third resin, the polysiloxane segments introduced in the resin is hydrophobic (water-repellant) so that, basically speaking, the use of the resin, which contains the segments, in the formation of the ink-receiving layer should not make it possible to expect good results in connection with the absorption of a water-based ink.

It is however known that the surface of an ink-receiving layer made of the third resin, which contains polysiloxane segments in a specific proportion range, is fully covered with polysiloxane segments in a dry state but, when the ink-receiving layer is dipped in water or the like, the resin shows a phenomenon that the polysiloxane segments are buried within the resin, in other words, the resin has environmental responsibility [Kobunshi Ronbunshu (see Collected Papers on Polymers), 48[4], 227 (1991); etc.].

In the third aspect of the present invention, this phenomenon is used. The formation of an ink-receiving layer with the third resin, which contains polysiloxane segments, makes it possible to provide a recording sheet having good ink absorbency in contrast to an expectation, capable of imparting good water-proofness to marks to be formed, and also capable of exhibiting good transportability inside a printer. Namely, the adequate control of the content of polysiloxane segments in resin molecules has made it possible to provide a recording sheet excellent in surface lubricity, waterproofness, the transportability and blocking resistance in printers, and the like owing to the environmental responsibility, because upon being printed with a water-based ink, the surface of its ink-receiving layer shows hydrophilicity and the polysiloxane segments in the resin act to embrace a dye bonded with the resin through ionic bonding between tertiary amino groups introduced in the hydrophilic resin and the ink but, during and after drying subsequent to the recording with the water-based ink, the surface of the ink-receiving layer is covered with the polysiloxane segments.

As the third resin for use in the present invention, resins containing polysiloxane segments in addition to the above-described silyl groups and tertiary amino groups in their molecules are all usable. Illustrative examples of usable resins can include hydrophilic polyurethane resins, hydrophilic polyurea resins, hydrophilic polyurethane-polyurea resins, hydrophilic polyamide resin, hydrophilic polyester resins, hydrophilic acrylic resins and hydrophilic epoxy resins, all of which contain such groups as mentioned above. Among these, preferred hydrophilic resins are hydrophilic polyurethane resins, hydrophilic polyurea resins, hydrophilic polyurethane-polyurea resins and hydrophilic polyamide resins.

As a method for introducing polysiloxane segments into the second resin, it can be mentioned to synthesize (polymerize) a hydrophilic resin by using, as a portion of a raw material for the third resin, a polysiloxane compound containing one or more reactive groups, for example, amino, epoxy, hydroxyl, mercapto, carboxyl or like groups in its molecule.

Preferred examples of the polysiloxane compound containing such reactive groups can include the following compounds:

(1) Amino modified polysiloxane compounds

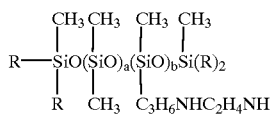

(a = 1–200, b = 2–200, R = CH₃ or OCH₃)

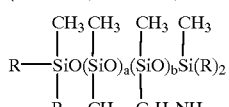

(a = 1–200, b = 2–200, R = CH₃ or OCH₃)

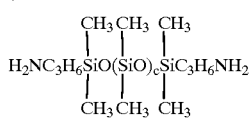

(c = 1–300)

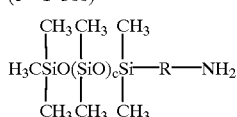

(c = 1–300, R = lower alkylene)

(2) Epoxy-modified polysiloxane compounds

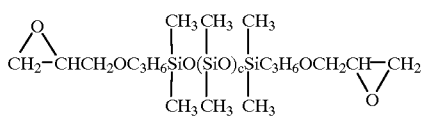

(c = 1–300)

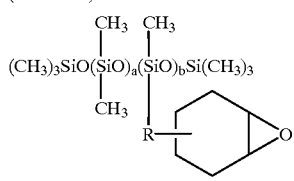

(a = 1–200, b = 2–200, R = lower alkylene)

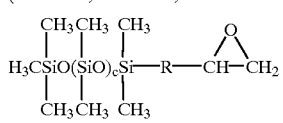

(c = 1–300, R = lower alkylene)

-continued (3) Alcohol-modified polysiloxane compounds

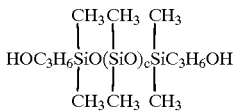

(c = 1–300)

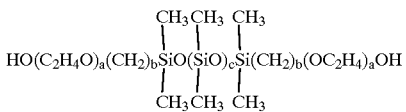

(a = 1–300, b = 2–6, c = 1–300)

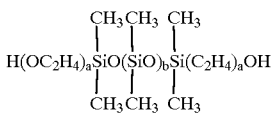

(a = 1–300, b = 1–300)

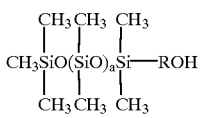

(a = 1–200, R = lower alkylene)

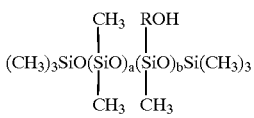

(a = 1–200, b = 2–200, R = lower alkylene)

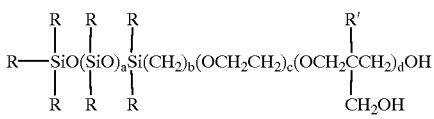

(R = CH$_3$ or OCH$_3$, R' = H or lower alkyl, a = 1–300, b = 0–5, c = 0–50, d = 1–3)

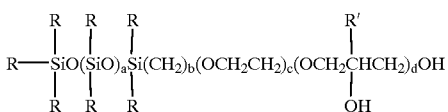

(R = CH$_3$ or OCH$_3$, R' = H or alkyl, a = 1–300, b = 0–5, c = 0–50, d = 1–3)

(4) Mercapto-modified polysiloxane compounds

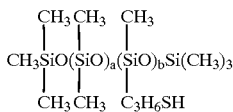

(a = 1–200, b = 2–200)

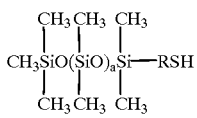

(a = 1–200, R = lower alkylene)

(5) Carboxyl-modified polysiloxane compounds

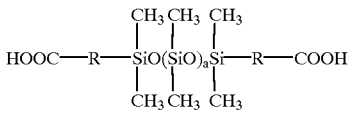

(a = 1–300, R = lower alkylene)

-continued

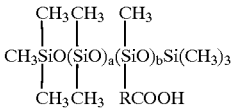

(a = 1–200, b = 2–200, R = lower alkylene)

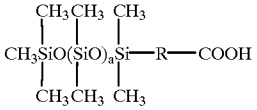

(a = 1–300, R = lower alkylene)

Incidentally, the hydrophilic polyurethane resin, hydrophilic polyurea resin or hydrophilic polyurethane-polyurea resins—which is available from the above-described raw material components, contains hydrolyzable silyl groups in the ends or side chains of its molecule and also contains tertiary amino groups and polysiloxane segments in its molecule—can be obtained following a conventionally known synthesis process of the resin. No particular limitation should therefore be imposed on the synthesis processes and raw material components of these resins.

A more specific description will be made about preferred examples of raw material components for the synthesis of the first to third resins, said raw material components being other than those described above. Hydrophilic compounds preferable for use in obtaining the above-described hydrophilic resins are compounds each of which contains a hydroxyl group, an amino group, a carboxyl group or the like as an end group and has a molecular weight in a range of from 100 to 8,000.

Illustrative of compounds containing hydroxyl groups as end groups and having hydrophilicity are:
polyethylene glycol,
copolymerized polyol of polyethylene glycol and polytetramethylene glycol,
copolymerized polyol of polyethylene glycol and polypropylene glycol,
polyethylene glycol adipate,
polyethylene glycol succinate,
copolymerized polyol of polyethylene glycol and poly-ε-caprolactone, and
copolymerized polyol of polyethylene glycol and poly-γ-valerolactone.

Illustrative of compounds containing amino groups as end groups and having hydrophilicity are:
polyethylene oxide diamine,
polyethylene oxide propylene oxide diamine,
polyethylene oxide triamine, and
polyethylene oxide propylene oxide triamine.

Besides the above-described compounds, ethylene oxide adducts containing carboxyl groups or vinyl groups and like compounds can also be used. One or more of other polyols, polyamines and polycarboxylic acid compound having no hydrophilicity can also be used in combination with the above-described raw material components in order to impart other property or properties.

The preferable weight average molecular weight of the first resin useful in the first aspect of the present invention, the second resin useful in the second aspect of the present invention and the third resin useful in the third aspect of the present invention, which are available from the above-described materials, may range from about 5,000 to 500,000 or so, with a weight average molecular weight of from 30,000 to 200,000 being more preferred.

When these resins are each synthesized by a polymerization reaction of the above-described raw material components, they can be either those synthesized in a solventless manner or those synthesized in water or an organic solvent. From the standpoint of production steps, production of the resin in an organic solvent, which is usable upon formation of an ink-receiving layer, or in water is advantageous because the resulting resin solution can be used as is for the formation of the ink-receiving layer.

The hydrolyzable silyl groups in the first resin may be contained in either one or both of its side chains (pendants) and its back bone. The content of the hydrolyzable silyl groups in the resin may preferably be in a range of from 1 to 40 wt. %, in terms of the hydrolyzable-silyl-group-containing compound as the raw material, of the whole resin. On the other hand, the number of the hydrolyzable silyl groups may be from 0.001 to 10.0 equivalents per gram, preferably from 0.01 to 1.0 equivalent per gram, in other words, may be from 0.001 to 10 groups, preferably from 0.01 to 1.0 group per 1,000 weight average molecular weight of the hydrophilic resin.

If the content of the hydrolyzable silyl groups is smaller than the above range, the resulting ink-receiving layer cannot fully exhibit properties such as blocking resistance, waterproofness and moisture resistance, the attainment of which is an objective of the present invention. On the other hand, a content of hydrolyzable silyl groups higher than the above range leads to an ink-receiving layer having stronger water-proofness due to a reduction in the proportion of hydrophilic segments in the hydrophilic resin and also due to a crosslinked structure of the resin, leading to deteriorations in the water-absorbing performance and the quality of printed marks. Contents of hydrolyzable silyl groups outside the above range are therefore not preferred.

On the other hand, the content of the silyl groups in the second resin is similar to that in the second resin. Further, the tertiary amino groups may be contained in either one or both of the side chains (pendants) and the back bone. The content of the tertiary amino groups in the resin may preferably be in a range of from 1 to 60 wt. %, in terms of the tertiary amino compound as the raw material, of the whole resin. If the content of the tertiary amino compound is smaller than the above range, the resulting ink-receiving layer cannot fully exhibit waterproofness, moisture resistance and the like, the attainment of which is an objective of the present invention. On the other hand, a content of the tertiary amino compound higher than the above range leads to an ink-receiving layer having stronger water repellency due to a reduction in the proportion of hydrophilic segments, and hence to deteriorations in the absorbency of a water-based ink and the quality of printed marks. Contents of the tertiary amino compound outside the above range are therefore not preferred.

Further, the number of tertiary amino groups may be from 0.1 to 50 equivalents per gram, preferably from 0.2 to 10.0 equivalents per gram, in other words, may be from 1 to 50 groups, preferably from 2 to 5 groups per 1,000 weight average molecular weight of the hydrophilic resin. If the number of tertiary amino groups is smaller than the above range, the fixability of a dye, the waterproofness of formed marks, and the like properties are insufficient. If the number of tertiary amino groups is greater than the above range, on the other hand, the resulting resin is provided with stronger water repellency due to a reduction in the proportion of hydrophilic segments in the resin, raising a problem in the ink absorbency or the like of an ink-receiving layer to be formed.

In addition, the silyl groups and tertiary amino groups in the third resin are as described above. The polysiloxane segments may also be contained in either one or both of the side chain (pendants) and the back-bone. The content of the segments in the resin may be in a range of from 0.1 to 10 wt. %, notably of from 0.5 to 10 wt. % of the whole resin. If the content of the polysiloxane segments is smaller than 0.1 wt. %, the good surface properties—such as waterproofness, running property, transportability and blocking resistance—of a recording sheet, the attainment of which is an objective of the present invention, cannot be fully brought about. On the other hand, a content of polysiloxane segments higher than 10 wt. % leads to stronger water repellency for the polysiloxane segments and hence to deteriorations in the absorbency of a water-based ink in an ink-receiving layer to be formed and the quality of printed marks to be formed on the ink-receiving layer. Contents of polysiloxane segments outside the above range are therefore not preferred.

Usable examples of the base material sheets in the recording sheets according to the present invention can include paper sheets, plastic films, glass sheets and the like, although no particular limitation is imposed on the base material sheets. Exemplary paper sheets can include high-quality paper sheets (i.e., wood-free paper sheets), medium-quality paper sheets (i.e., paper sheets made of at least 70% of chemical pulp and the remainder of groundwood pulp), coated paper sheets, and cast-coated paper sheets. Illustrative of plastic films can be polyester, cellulose triacetate, polycarbonate, poly(vinyl chloride), polypropylene, polyamide, polystyrene, polyethylene and poly(methyl methacrylate) sheets of 50–250 $\mu$m in thickness. If necessary, these base material sheets can each be provided with a primer layer to improve the adhesion of its ink-receiving layer to the base material sheet and/or can each be provided, on its back side opposite to its ink-receiving layer, with an anti-curling layer or with a lubricant layer which improves the coefficient of friction.

As the resin component constituting the ink-receiving layer, the above-described resins can be used singly. Depending on the composition of an ink to be used in ink-jet recording, each of the above-described resins may also be used in combination with another water-soluble resin with a view to adjusting the hydrophilicity and/or water absorbency of the ink-receiving layer or additionally imparting such property and/or properties to the ink-receiving layer. Usable examples of the water-soluble resin can include polyvinyl alcohol, modified polyvinyl alcohol, hydroxyethylcellulose, CMC, cellulose derivatives, polyvinylpyrrolidone, starch, cationized starch, gelatin, casein, and acrylic acid polymers.

Further, a hydrophobic resin may also be used in combination with the each of the above-described resins with a view to imparting additional waterproofness and durability to the ink-receiving layer and also to printed marks to be formed thereon. Usable examples of the hydrophobic resin can include polyester resins, poly(vinyl chloride) resin, polystyrene resin, poly(methyl methacrylate) resin, polycarbonate resins, polyurethane resins, vinyl chloride-vinyl acetate copolymer resins, acrylonitrile-styrene copolymer resins, polyvinyl butyral resin, polyamide resins, epoxy resins, urea resins, and melamine resins.

Moreover, one or more inorganic or organic pigments and/or resin particles can also be incorporated in the ink-receiving layer in order to provide the ink-receiving layer with improved ink absorbency, dye fixability, dye-color-producing ability, blocking resistance and waterproofness. As such pigments and resin particles, one or more pigments and resin particles can be suitably chosen in accordance with the quality design of the recording sheet from known pigments and resin particles, for example, mineral or porous pigments—such as kaolin, delaminated kaolin, aluminum hydroxide, silica, diatomaceous earth, calcium carbonate, talc, titanium oxide, calcium sulfate, barium sulfate, zinc oxide, alumina, calcium silicate, magnesium silicate, colloidal silica, zeolite, bentonite, sericite and lithopone; fine particles and fine porous particles of plastic pigments composed of polystyrene resin, urea resins, acrylic resins, melamine resins, benzoguanamine resin or polyurethane resins; and hollow particles composed of these materials.

In addition to such resins and pigments, one or more of various other additives can also be incorporated in the ink-receiving layer as needed. These additives can include thickening agents, parting agents, penetrating agents, wetting agents, thermal gelling agents, sizing agents, defoaming agents, foam suppressors, blowing agents, coloring matters, fluorescent whiteners, ultraviolet absorbers, oxidation inhibitors, quenchers, antiseptic agents, antistatic agents, crosslinking agents, dispersants, lubricants, plasticizers, pH regulators, flow improvers, setting promoters, and water-proofing agents.

A description will next be made about the formation of an ink-receiving layer. First, a hydrophilic resin containing hydrolyzable silyl groups in its molecule, a hydrophilic resin containing hydrolyzable silyl groups and tertiary amino groups in its molecule or a hydrophilic resin containing hydrolyzable silyl groups, tertiary amino groups and polysiloxane segments in its molecule is dissolved or dispersed either by itself or, if necessary, together with one or more other resins in one of various organic solvents or in water and, if necessary, one or more of the above-described pigments, resin particles and various additives may then added and mixed, whereby a coating formulation is prepared. Examples of the solvent usable for the preparation of the coating formulation can include water (in this case, the coating formulation is obtained in the form of a dispersion or an emulsion), methanol, ethanol, propanol, acetone, methyl ethyl ketone, toluene, xylene, ethyl acetate, ethyl butyrate, dioxane, pyrrolidone, dimethylformamide, formamide and dimethylsulfoxide; and mixtures thereof. The concentration of the above-described hydrophilic resin in the coating formulation may range generally from about 5 to 50 wt. %, preferably from about 10 to 30 wt. %. Further, the viscosity of the coating formulation may range from about 1 to 500 dPa.s, preferably from about 10 to 200 dPa.s in view of coating applicability. One or more of the various pigments may be added generally in a total amount of from 0 to 5 parts by weight, preferably in a total amount of from about 0.5 to 20 parts by weight per 100 parts by weight of the hydrophilic resin.

Illustrative of a coating method of the coating formulation on the base material sheet can be gravure coating, direct or reverse roll coating, wire bar coating, air knife coating, curtain coating, blade coating, rod coating, and die coating. The recording sheet according to the present invention can be obtained by applying the coating formulation on at least one side of the base material sheet to give a predetermined dry thickness and then drying the thus-applied coating formulation. After the application of the coating formulation, surface finishing may be applied by using a calender such as a machine calender, supercalender or soft calender.

The coating weight of the above coating formulation may be generally from 0.5 to 50 g/m$^2$ or so, preferably from 3 to 30 g/cm$^2$ or so in terms of dry weight. If the coating weight is smaller than 0.5 g/m$^2$, the resulting ink-receiving layer cannot exhibit sufficient ink absorbency. Even if the coating weight exceeds 50 g/m$^2$, the effects of the present invention are not exhibited to greater extents. Accordingly, such an excessively large coating weight is not economical and, moreover, tends to induce folding, cracking, curling and the like on the resulting recording sheet.

The present invention will next be described more specifically by the following Referential Examples, Examples and Comparative Examples, in which all the designations of "part" or "parts" and "%" are by weight unless otherwise specifically indicated.

[First Aspect of the Present Invention]

REFERENTIAL EXAMPLE 1

(Production example of polyurethane resin containing hydrolyzable silyl groups in side chains of its molecule)

In a reactor, 150 parts of polyethylene glycol (molecular weight: 2,040) and 15 parts of 1,3-butylene glycol were dissolved in a mixed solvent consisting of 125 parts of toluene and 100 parts of methyl ethyl ketone, followed by the addition of 58 parts diphenylmethane diisocyanate at 70° C. with thorough stirring. After completion of the addition, 100 parts of methyl ethyl ketone were added further and the contents were allowed to react at 80° C. for 6 hours. In an infrared absorption spectrum of the resultant resin, no absorption was observed corresponding to hydroxyl groups. Further, hydroxyl groups were not confirmed either through quantitation by the pyridine method (JIS K-0070 2.5).

To the above resin solution, 8 parts of a silane coupling agent containing an isocyanate group [$(C_2H_5O)_3Si(CH_2)_3NCO$] were then added. They were allowed to react at 80° C. for 8 hours. Subsequent to confirmation of non-existence of isocyanate groups, the solid concentration of the reaction mixture was adjusted to 35% so that a solution of a first resin was obtained. This resin solution had a viscosity of 380 dPa.s (25° C.).

REFERENTIAL EXAMPLE 2

(Production example of polyurea resin containing hydrolyzable silyl groups in the ends of its molecule)

In a reactor, 38 parts of hydrogenated MDI were dissolved in 100 parts of dimethylformamide. While stirring the solution with its internal temperature maintained at 20° C., a solution of 150 parts of polyethyleneoxidediamine ("Jeffermin ED", trade name; product of Texaco Chemical Inc.; molecular weight: 2,000) in 50 parts of dimethylformamide was gradually added dropwise. After completion of the dropwise addition, the contents were allowed to react at 50° C. for 3 hours, whereby an isocyanate-terminated polyurea resin was obtained. The internal temperature was lowered to 20° C. again, and a solution of 2.8 parts of 1,4-diaminobutane in 50 parts of methyl ethyl ketone was gradually added dropwise. After completion of the dropwise addition, the contents were allowed to react at the same temperature for 1 hour. A solution of 14 parts of γ-aminopropyltriethoxysilane in 100 parts of methyl ethyl ketone was then gradually added dropwise, followed by a reaction at 30° C. for 1 hour. Subsequent to confirmation of non-existence of isocyanate groups, the solid concentration of the reaction mixture was adjusted to 35% so that a solution of another first resin was obtained. This resin solution had a viscosity of 230 dPa.s (25° C.)

REFERENTIAL EXAMPLE 3

(Production example of polyurethane-polyurea resin containing hydrolyzable silyl groups in the ends and side chains of its molecule)

(1) Production of isocyanate-terminated silane coupling agent

While thoroughly stirring 270 parts of an adduct of hexamethylene diisocyanate and water ("Duranate 24A-100", trade name; product of Asahi Chemical Industry Co., Ltd.) at 25° C. in a reactor, 111 parts of γ-aminopropyltriethoxysilane were gradually added dropwise into the adduct to react them, so that a colorless, clear, viscous liquid product (I) was obtained. The thus-obtained product contained free isocyanate groups in a proportion of 10.5% [theoretical value (the proportion of free isocyanate groups stoichiometrically introduced when the reaction has proceeded 100%): 11.2%]. Theoretically, the product is believed to be a compound of the following structure:

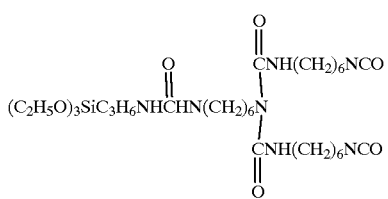

(2) Production of polyurethane-polyurea containing hydrolyzable silyl groups in the ends and side chains of its molecule In a reactor, 8 parts of the above-described viscous liquid product (I) and 46 parts of toluene diisocyanate were dissolved in 150 parts of dimethylformamide. A solution of 150 parts of polyethylene glycol (molecular weight: 2,040) in 100 parts of methyl ethyl ketone was added, followed by the further addition of 6 parts of 1,3-butylene glycol. The contents were allowed to react at 80° C. for 5 hours, whereby an isocynate-terminated polyurethane resin was obtained.

While maintaining the internal temperature at 20° C., a solution of 7 parts of 1,4-diaminobutane in 50 parts of methyl ethyl ketone was gradually added dropwise. After completion of the dropwise addition, the contents were allowed to react at the same temperature for 1 hour. In addition, a solution of 16 parts of γ-aminopropyltriethoxysilane in 100 parts of methyl ethyl ketone was gradually added dropwise, and the contents were allowed to react at 30° C. for 1 hour. Subsequent to confirmation of non-existence of isocyanate groups, the solid concentration of the reaction mixture was adjusted to 35% so that a solution of a further first resin was obtained. This solution had a viscosity of 330 dPa.s (25° C.).

REFERENTIAL EXAMPLE 4

(Production example of polyurethane resin for use in Comparative Example 1)

A polyurethane resin solution was obtained using the same materials and formula as in Referential Example 1 except that the isocyanate-group-containing silane coupling agent was not used. This solution had a viscosity of 540 dPa.s (25° C.) at a solid content of 35%.

REFERENTIAL EXAMPLE 5

(Production example of polyurea resin for use in Comparative Example 2)

A polyurea resin solution was obtained using the same materials and formula as in Referential Example 2 except that γ-aminopropyltriethoxysilane was not used. This solution had a viscosity of 260 dPa.s (25° C.) at a solid content of 35%.

REFERENTIAL EXAMPLE 6

(Production example of polyurethane-polyurea resin for use in Comparative Example 3)

A polyurethane-polyurea resin solution was obtained using the same materials and formula as in Referential Example 3 except that the isocyanate-terminated silane coupling agent and γ-aminopropyltriethoxysilane were not used. This solution had a of 220 dPa.s (25° C.) at a solid content of 35%.

The weight average molecular weights of the respective resins obtained above in Referential Examples 1–6 and the equivalents of hydrolyzable silyl groups in the respective resins were as shown below in Table 1.

TABLE 1

| Referential Example | Weight average molecular weight | Equivalent of silyl groups |
|---|---|---|
| 1 | 94,000 | 0.4 eq/g |
| 2 | 62,000 | 0.5 eq/g |
| 3 | 82,000 | 0.3 eq/g |
| 4 | 98,000 | 0 |
| 5 | 48,000 | 0 |
| 6 | 67,000 | 0 |

EXAMPLES 1–3

In each Example, 40 parts of the resin obtained in the corresponding one of Referential Examples 1–3, 0.005 part of tin octylate, 100 parts of fine particulate synthetic amorphous silica (BET specific surface area: 300 $m^2/g$, product of Mizusawa Industrial Chemicals, Ltd.) and 0.2 part of a dispersant (sodium polypyrophosphate) were dispersed and mixed in a methyl ethyl ketone/toluene mixed solvent, and the solid content of the resulting dispersion was adjusted to 15%. Three coating formulations according to the present invention were therefore obtained for the formation of ink-receiving layers. Each coating formulation was applied by an air knife coater on a wood-free paper sheet having a basis weight of 35 $g/m^2$ to give a solid coat weight of 10 $g/m^2$, and was then dried. The thus-coated paper sheet was supercalendered under a linear pressure of 200 Kg/cm to form an ink-receiving layer. Three recording sheets according to the present invention were therefore obtained in Examples 1–3, respectively.

COMPARATIVE EXAMPLES 1–3

In each Comparative Example, 40 parts of the resin obtained in the corresponding one of Referential Examples 4–6, 100 parts of fine particulate synthetic amorphous silica (BET specific surface area: 300 $m^2/g$, product of Mizusawa Industrial Chemicals, Ltd.) and 0.2 part of a dispersant (sodium polypyrophosphate) were dispersed and mixed in a methyl ethyl ketone/toluene mixed solvent, and the solid content of the resulting dispersion was adjusted to 15%. Three coating formulations were therefore obtained for the formation of ink-receiving layers. Each coating formulation was applied by an air knife coater on a wood-free paper sheet having a basis weight of 35 $g/m^2$ to give a solid coat weight of 10 $g/m^2$, and was then dried. The thus-coated paper sheet was supercalendered under a linear pressure of 200 Kg/cm to form an ink-receiving layer. Three recording sheets were therefore obtained in Comparative Examples 1–3, respectively.

Using the six (6) recording sheets obtained as described above, printing or recording was conducted with four colors of yellow, magenta, cyan and black on an ink-jet printer which was designed to perform printing or recording with inks of water-soluble dyes. The following properties were ranked. The ranking results are presented in Table 2.

Ink absorbency

The number of seconds required until printed inks dried was counted, and ink absorbency was ranked in accordance with the following ranking standard.
A: 5 seconds or shorter.
B: 6 to 10 seconds.
C: 11 seconds or longer.

Vividness of produced colors

A color mark was printed by the above-described printer and the vividness of the thus-obtained color mark was then visually observed. The vividness of the produced colors was ranked in accordance with the following ranking standard.
A: Good
B: Average
C: Poor Blotting resistance The extents of ink blotting and bleeding at an overprinted boundary area of magenta and cyan were visually observed. The blotting resistance was ranked in accordance with the following ranking standard.
A: Good
B: Average
C: Poor Waterproofness of ink-receiving layer Each ink-receiving layer was wetted with water. The state of separation of the ink-receiving layer upon wiping the water off under constant finger pressure was visually observed. The waterproofness of the ink-receiving layer was ranked in accordance with the following ranking standard.
A: No change.
B: Changed in surface conditions.
C: Separated.

Waterproofness of printed mark

After printing each recording sheet by the printer, the recording sheet was dipped for 10 minutes in water, and the recording sheet was then dried at room temperature. The recorded mark was visually observed for changes in blotting and color. The water-proofness of the printed mark was ranked in accordance with the following ranking standard.
A: No change.
B: Some color changes were observed.
C: Color changes were observed.

The resin solutions obtained in Referential Examples 1–6 were individually coated on 100-μm PET films to give a dry coat thickness of 20 μm, whereby transparent sheets were produced. In a similar manner as described above, printing or recording was conducted by the ink jet printer. Properties were ranked by the following methods, respectively.

Blocking resistance

An untreated PET film was placed over the resin-coated side of each transparent sheet and, under a load of 0.29 MPa, the film and the sheet were left over at 40° C. for 1 day. The untreated PET film was then removed, and the blocking resistance of the transparent sheet was visually observed. The blocking resistance was ranked in accordance with the following ranking standard.

A: No blocking.
B: Slight blocking.
C: Severe blocking.

Printer transportability

The printer transportability of each transparent sheet upon printing or recording it by the ink-jet printer was observed, and was ranked in accordance with the following ranking standard.
A: Good transportability.
B: Slight noise was produced.
C: Poor transportability.

Waterproofness of printed mark

After each transparent sheet was printed by the printer, the recorded sheet was dipped for 24 hours in water and was then dried at room temperature. The recorded mark was visually observed for changes in blotting and color. The waterproofness of the printed mark was ranked in accordance with the following ranking standard.
A: No change.
B: Some color changes were observed.
C: The dyes were completely dissolved, resulting in the disappearance of the mark.

TABLE 2

| Ranked properties | Example | | | Comparative Example | | |
| --- | --- | --- | --- | --- | --- | --- |
| | 1 | 2 | 3 | 1 | 2 | 3 |
| Ink absorbency | A | A | A | A | A | A |
| Vividness of produced color | A | A | A | A | A | A |
| Blotting resistance | A | A | A | A | A | A |
| Waterproofness of ink-receiving layer | A | A | A | B | B | B |
| Waterproofness of printed mark (wood-free paper sheet) | A | A | A | B | B | B |
| Blocking resistance | A | A | A | C | C | C |
| Printer transportability | A | A | A | C | C | C |
| Waterproofness of printed mark (PET film) | A | A | A | C | C | C |

As has been described above, the first aspect of the present invention provides an ink-jet recording sheet, which gives printed marks of high quality, is excellent in the waterproofness and moisture resistance of its ink-receiving layer and printed marks, and also is excellent in the transportability and blocking resistance in a printer.

[Second Aspect of the Present Invention]

REFERENTIAL EXAMPLE 1

(Production example of polyurethane resin containing hydrolyzable silyl groups and tertiary amino groups in side chains of its molecule)

In a reactor, 150 parts of polyethylene glycol (molecular weight: 2,040), 7 parts of 1,3-butylene glycol and 15 parts of N-methyldiethanolamine were dissolved in a mixed solvent consisting of 135 parts of toluene and 100 parts of methyl ethyl ketone, followed by the addition of 69 parts diphenylmethane diisocyanate at 70° C. with thorough stirring.

After completion of the addition, 100 parts of methyl ethyl ketone were added further and the contents were allowed to react at 80° C. for 6 hours. In an infrared absorption spectrum of the resultant resin, no absorption was observed corresponding to hydroxyl groups. Further, hydroxyl groups were not confirmed either through quantitation by the pyridine method (JIS K-0070 2.5). Eight (8) parts of a silane coupling agent containing an isocyanate group [(C₂H₅O)₃Si(CH₂)₃—NCO] were then added. They were allowed to react at 80° C. for 8 hours. Subsequent to confirmation of non-existence of isocyanate groups, the solid concentration of the reaction mixture was adjusted to 35% so that a solution of a second resin was obtained. This resin solution had a viscosity of 330 dPa.s (25° C.).

REFERENTIAL EXAMPLE 2 (Production example of polyurea resin containing hydrolyzable silyl groups and tertiary amino groups in the ends of its molecule)

In a reactor, 71 parts of hydrogenated MDI were dissolved in 200 parts of dimethylformamide. While thoroughly stirring the solution with its internal temperature maintained at 20° C., a solution of 150 parts of polyethyleneoxidediamine ("Jeffermin ED", trade name; product of Texaco Chemical Inc.; molecular weight: 2,000) in 50 parts of dimethylformamide was gradually added dropwise. After completion of the dropwise addition, the contents were allowed to react at 50° C. for 1 hour. Further, a solution of 10 parts of methyliminobispropylamine in 50 parts of methyl ethyl ketone was gradually added dropwise. After completion of the dropwise addition, the contents were allowed to react at 50° C. for 3 hours, whereby an isocyanate-terminated polyurea resin was obtained.

The internal temperature was lowered to 20° C. again, and a solution of 5.7 parts of 1,4-diaminobutane in 50 parts of methyl ethyl ketone was gradually added dropwise. After completion of the dropwise addition, the contents were allowed to react at the same temperature for 1 hour. A solution of 28 parts of γ-aminopropyltriethoxysilane in 100 parts of methyl ethyl ketone was then gradually added dropwise, followed by a reaction at 30° C. for 1 hour. Subsequent to confirmation of non-existence of isocyanate groups, the solid concentration of the reaction mixture was adjusted to 35% so that a solution of another second resin was obtained. This resin solution had a viscosity of 270 dPa.s (25° C.).

REFERENTIAL EXAMPLE 3

(Production example of polyurethane-polyurea resin containing hydrolyzable silyl groups and tertiary amino groups in the ends and side chains of its molecule)

(1) Production of isocyanate-terminated silane coupling agent

While thoroughly stirring 270 parts of an adduct of hexamethylene diisocyanate and water ("Duranate 24A-100", trade name; product of Asahi Chemical Industry Co., Ltd.) at 25° C. in a reactor, 111 parts of γ-aminopropyltriethoxysilane were gradually added dropwise into the adduct to react them, so that a colorless, clear, viscous liquid product (I) was obtained. The thus-obtained product contained free isocyanate groups in a proportion of 10.5% [theoretical value (the proportion of free isocyanate groups stoichiometrically introduced when the reaction has proceeded 100%): 11.2%]. Theoretically, the product is believed to be a compound of the following structure:

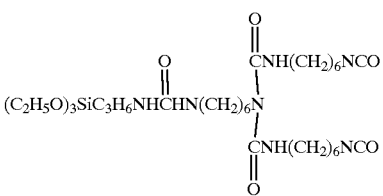

(2) Production of polyurethane-polyurea containing hydrolyzable silyl groups and tertiary amino groups in the ends and side chains of its molecule In a reactor, 8 parts of the above-described viscous liquid product (I) and 50 parts of toluene diisocyanate were dissolved in 200 parts of dimethylformamide. A solution of 150 parts of polyethylene glycol (molecular weight: 2,040) in 100 parts of methyl ethyl ketone was added, followed by the further addition of 4 parts of 1,3-butylene glycol and 9 parts of N,N-dimethyl-N',N'-dihydroxyethyl-1,3-diaminopropane. The contents were allowed to react at 60° C. for 6 hours, whereby an isocynate-terminated polyurethane-polyurea resin was obtained.

While maintaining the internal temperature at 20° C., a solution of 8 parts of 1,4-diaminobutane in 50 parts of methyl ethyl ketone was gradually added dropwise. After completion of the dropwise addition, the contents were allowed to react at the same temperature for 1 hour. In addition, a solution of 21 parts of γ-aminopropyltrimethoxysilane in 100 parts of methyl ethyl ketone was gradually added dropwise, and the contents were allowed to react at 30° C. for 1 hour. Subsequent to confirmation of non-existence of isocyanate groups, the solid concentration of the reaction mixture was adjusted to 35% so that a solution of a further second resin was obtained. This solution had a viscosity of 300 dPa.s (25° C.).

REFERENTIAL EXAMPLE 4

(Production example of polyurethane resin for use in Comparative Example 1)

A polyurethane resin solution was obtained using the same materials and formula as in Referential Example 1 except that N-methyldiethanolamine and the isocyanate-group-containing silane coupling agent were not used. This solution had a viscosity of 350 dPa.s (25° C.) at a solid content of 35%.

REFERENTIAL EXAMPLE 5

(Production example of polyurea resin for use in Comparative Example 2)

A polyurea resin solution was obtained using the same materials and formula as in Referential Example 2 except that methyliminobispropylamine and γ-aminopropyltriethoxysilane were not used. This solution had a viscosity of 380 dPa.s (25° C.) at a solid content of 35%.

REFERENTIAL EXAMPLE 6

(Production example of polyurethane-polyurea resin for use in Comparative Example 3)

A polyurethane-polyurea resin solution was obtained using the same materials and formula as in Referential Example 3 except that the isocyanate-terminated silane coupling agent and γ-aminopropyltrimethoxysilane were not used. This solution had a viscosity of 220 dPa.s (25° C.) at a solid content of 35%.

The weight average molecular weights of the respective resins obtained above in Referential Examples 1–6 and the equivalents of hydrolyzable silyl groups and the equivalents of tertiary amino groups in the respective resins were as shown below in Table 3.

TABLE 3

| Referential Example | Weight average molecular weight | Equivalent of silyl groups | Equivalent of tertiary amino groups |
|---|---|---|---|
| 1 | 85,000 | 0.07 eq/g | 0.5 eq/g |
| 2 | 72,000 | 0.3 eq/g | 0.3 eq/g |
| 3 | 82,000 | 0.3 eq/g | 0.4 eq/g |
| 4 | 86,000 | 0 | 0 |
| 5 | 91,000 | 0 | 0 |
| 6 | 68,000 | 0 | 0 |

EXAMPLES 1–3

In each Example, 40 parts of the resin obtained in the corresponding one of Referential Examples 1–3, 0.005 part of tin octylate, 100 parts of fine particulate synthetic amorphous silica (BET specific surface area: 300 m²/g, product of Mizusawa Industrial Chemicals Ltd.) and 0.2 part of a dispersant (sodium polypyrophosphate) were dispersed and mixed in a methyl ethyl ketone/toluene mixed solvent, and the solid content of the resulting dispersion was adjusted to 15%. Three coating formulations according to the present invention were therefore obtained for the formation of ink-receiving layers. Each coating formulation was applied by an air knife coater on a wood-free paper sheet having a basis weight of 35 g/m² to give a solid coat weight of 10 g/m², and was then dried. The thus-coated paper sheet was supercalendered under a linear pressure of 200 Kg/cm to form an ink-receiving layer. Three recording sheets according to the present invention were therefore obtained in Examples 1–3, respectively.

COMPARATIVE EXAMPLES 1–3

In each Comparative Example, 40 parts of the resin obtained in the corresponding one of Referential Examples 4–6, 100 parts of fine particulate synthetic amorphous silica (BET specific surface area: 300 m²/g, product of Mizusawa Industrial Chemicals, Ltd.) and 0.2 part of a dispersant (sodium polypyrophosphate) were dispersed and mixed in a methyl ethyl ketone/toluene mixed solvent, and the solid content of the resulting dispersion was adjusted to 15%. Three coating formulations were therefore obtained for the formation of ink-receiving layers. Each coating formulation was applied by an air knife coater on a wood-free paper sheet having a basis weight of 35 g/m² to give a solid coat weight of 10 g/m², and was then dried. The thus-coated paper sheet was supercalendered under a linear pressure of 200 Kg/cm to form an ink-receiving layer. Three recording sheets were therefore obtained in Comparative Examples 1–3, respectively.

With respect to the six (6) recording sheets obtained as described above, ranking was made in the same manner as in the first aspect of the present invention. The ranking results are presented in Table 4.

TABLE 4

| Ranked properties | Example | | | Comparative Example | | |
|---|---|---|---|---|---|---|
| | 1 | 2 | 3 | 1 | 2 | 3 |
| Ink absorbency | A | A | A | A | A | A |
| Vividness of produced color | A | A | A | A | A | A |
| Blotting resistance | A | A | A | A | A | A |
| Waterproofness of ink-receiving layer | A | A | A | B | B | B |
| Waterproofness of printed mark (wood-free paper sheet) | A | A | A | B | B | B |
| Blocking resistance | A | A | A | C | C | C |
| Printer transportability | A | A | A | C | C | C |
| Waterproofness of printed mark (PET film) | A | A | A | C | C | C |

As has been described above, the second aspect of the present invention provides an ink-jet recording sheet, which gives printed marks of high quality, is excellent in the waterproofness and moisture resistance of its ink-receiving layer and printed marks, and also is excellent in the transportability and blocking resistance in a printer.

[Third Aspect of the Present Invention]

REFERENTIAL EXAMPLE 1

Production example of silicone polyurethane resin containing hydrolyzable silyl groups and tertiary amino groups in side chains of its molecule)

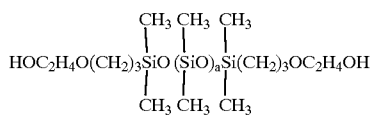

(wherein a stands for an integer to give a molecular weight of 3,200.)

In a reactor, 5 parts of a polydimethylsiloxane polyol having the above structure, 145 parts of polyethylene glycol (molecular weight: 2,040), 7 parts of 1,3-butylene glycol and 12 parts of N-methyldiethanolamine were dissolved in a mixed solvent consisting of 135 parts of toluene and 100 parts of methyl ethyl ketone, followed by the addition of 61 parts diphenylmethane diisocyanate at 70° C. with thorough stirring. After completion of the addition, 100 parts of methyl ethyl ketone were added further and the contents were allowed to react at 80° C. for 6 hours. In an infrared absorption spectrum of the resultant resin, no absorption was observed corresponding to hydroxyl groups. Further, hydroxyl groups were not confirmed either through quantitation by the pyridine method (JIS K-0070 2.5). Seven (7) parts of a silane coupling agent containing an isocyanate group [$(C_2H_5O)_3Si(CH_2)_3NCO$] were then added. They were allowed to react at 80° C. for 8 hours. Subsequent to confirmation of non-existence of isocyanate groups, the solid concentration of the reaction mixture was adjusted to 35% so that a solution of a third resin was obtained. This resin solution had a viscosity of 390 dPa.s (25° C.).

REFERENTIAL EXAMPLE 2

(Production example of silicone polyurea resin containing hydrolyzable silyl groups and tertiary amino groups in the ends of its molecule)

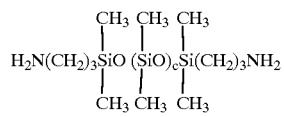

(wherein c stands for an integer to give a molecular weight of 3,880.)

In a reactor, 71 parts of hydrogenated MDI were dissolved in 200 parts of dimethylformamide. While thoroughly stirring the solution with its internal temperature maintained at 20° C., a solution of 145 parts of polyethyleneoxidediamine ("Jeffermin ED", trade name; product of Texaco Chemical Inc.; molecular weight: 2,000) and 5 parts of a polydimethylsiloxanediamine having the above structure (molecular weight: 3,880) in 100 parts of dimethylformamide was gradually added dropwise. After completion of the dropwise addition, the contents were allowed to react at 50° C. for 1 hour. Further, a solution of 10 parts of methyliminobispropylamine in 50 parts of methyl ethyl ketone was gradually added dropwise. After completion of the dropwise addition, the contents were allowed to react at 50° C. for 3 hours, whereby an isocyanate-terminated polyurea resin was obtained.

The internal temperature was lowered to 20° C. again, and a solution of 5.7 parts of 1,4-diaminobutane in 50 parts of methyl ethyl ketone was gradually added dropwise. After completion of the dropwise addition, the contents were allowed to react at the same temperature for 1 hour. A solution of 28 parts of γ-aminopropyltriethoxysilane in 100 parts of methyl ethyl ketone was then gradually added dropwise, followed by a reaction at 30° C. for 1 hour. Subsequent to confirmation of non-existence of isocyanate groups, the solid concentration of the reaction mixture was adjusted to 35% so that a solution of another third resin was obtained. This resin solution had a viscosity of 250 dPa.s (25° C.).

REFERENTIAL EXAMPLE 3

(Production example of silicone polyurethane-polyurea resin containing hydrolyzable silyl groups and tertiary amino groups in the ends and side chains of its molecule)

(1) Production of isocyanate-terminated silane coupling agent

While thoroughly stirring 270 parts of an adduct of hexamethylene diisocyanate and water ("Duranate 24A-100", trade name; product of Asahi Chemical Industry Co., Ltd.) at 25° C. in a reactor, 111 parts of γ-aminopropyltriethoxysilane were gradually added dropwise into the adduct to react them, so that a colorless, clear, viscous liquid product (I) was obtained. The thus-obtained product contained free isocyanate groups in a proportion of 10.5% [theoretical value (the proportion of free isocyanate groups stoichiometrically introduced when the reaction has proceeded 100%): 11.2%]. Theoretically, the product is believed to be a compound of the following structure:

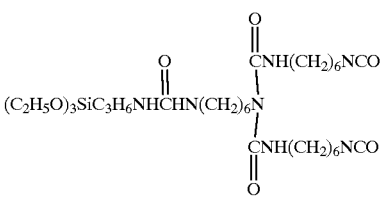

(2) Production of silicone polyurethane-polyurea containing hydrolyzable silyl groups and tertiary amino groups in the ends and side chains of its molecule

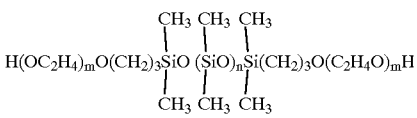

(wherein m and n stand for integers to give a molecular weight of 4,500.)

In a reactor, 8 parts of the above-described viscous liquid product (I) and 50 parts of toluene diisocyanate were dissolved in 200 parts of dimethylformamide. A solution of 145 parts of polyethylene glycol (molecular weight: 2,040) and 5 parts of an ethylene-oxide-added polydimethylsiloxane having the above structure in 100 parts of methyl ethyl ketone was added, followed by the further addition of 4 parts of 1,3-butylene glycol and 9 parts of N,N-dimethyl-N',N'-dihydroxyethyl-1,3-diaminopropane. The contents were allowed to react at 60° C. for 6 hours, whereby an isocynate-terminated polyurethane-polyurea resin was obtained.

While maintaining the internal temperature at 20° C., a solution of 8 parts of 1,4-diaminobutane in 50 parts of methyl ethyl ketone was gradually added dropwise. After completion of the dropwise addition, the contents were allowed to react at the same temperature for 1 hour. In addition, a solution of 20 parts of γ-aminopropyltrimethoxysilane in 100 parts of methyl ethyl ketone was gradually added dropwise, and the contents were allowed to react at 30° C. for 1 hour. Subsequent to confirmation of non-existence of isocyanate groups, the solid concentration of the reaction mixture was adjusted to 35% so that a solution of a further third resin was obtained. This solution had a viscosity of 320 dPa.s (25° C.).

REFERENTIAL EXAMPLE 4

(Production example of polyurethane resin for use in Comparative Example 1)

A hydrophilic polyurethane resin solution was obtained using the same materials and formula as in Referential Example 1 except that the polydimethylsiloxane polyol, N-methyldiethanolamine and the isocyanate-group-containing silane coupling agent were not used. This solution had a viscosity of 340 dPa.s (25° C.) at a solid content of 35%.

REFERENTIAL EXAMPLE 5

(Production example of polyurea resin for use in Comparative Example 2)

A hydrophilic polyurea resin solution was obtained using the same materials and formula as in Referential Example 2 except that the polydimethylsiloxanediamine, methyliminobispropylamine and γ-aminopropyltriethoxysilane were not used. This solution had a viscosity of 300 dPa.s (25° C.) at a solid content of 35%.

REFERENTIAL EXAMPLE 6

(Production example of polyurethane-polyurea resin for use in Comparative Example 3)

A hydrophilic polyurethane-polyurea resin solution was obtained using the same materials and formula as in Referential Example 3 except that the polydimethylsiloxane, isocyanate-terminated silane coupling agent and γ-aminopropyltrimethoxysilane were not used. This solution had a viscosity of 220 dPa.s (25° C.) at a solid content of 35%.

The weight average molecular weights of the respective resins obtained above in Referential Examples 1–6 and the equivalent of hydrolyzable silyl groups, the equivalents of tertiary amino groups and the contents (wt. %) of siloxane segments in the respective resins were as shown below in Table 5.

TABLE 5

| Referential Example | Weight average molecular weight | Equivalent of silyl groups | Equivalents of tertiary amino groups | Content of polysiloxane segments |
|---|---|---|---|---|
| 1 | 88,000 | 0.6 eq/g | 4.3 eq/g | 1.8 wt.% |
| 2 | 68,000 | 0.2 eq/g | 0.3 eq/g | 1.7 wt.% |
| 3 | 84,000 | 0.3 eq/g | 0.4 eq/g | 1.9 wt.% |
| 4 | 84,000 | 0 | 0 | 0 |
| 5 | 73,000 | 0 | 0 | 0 |
| 6 | 68,000 | 0 | 0 | 0 |

EXAMPLES 1–3

In each Example, 40 parts of the resin obtained in the corresponding one of Referential Examples 1–3, 0.005 part of tin octylate, 100 parts of fine particulate synthetic amorphous silica (BET specific surface area: 300 m$^2$/g, product of Mizusawa Industrial Chemicals, Ltd.) and 0.2 part of a dispersant (sodium polypyrophosphate) were dispersed and mixed in a methyl ethyl ketone/toluene mixed solvent, and the solid content of the resulting dispersion was adjusted to 15%. Three coating formulations according to the present invention were therefore obtained for the formation of ink-receiving layers. Each coating formulation was applied by an air knife coater on a wood-free paper sheet having a basis weight of 35 g/m$^2$ to give a solid coat weight of 10 g/m$^2$, and was then dried. The thus-coated paper sheet was supercalendered under a linear pressure of 200 Kg/cm to form an ink-receiving layer. Three recording sheets according to the present invention were therefore obtained in Examples 1–3, respectively.

COMPARATIVE EXAMPLES 1–3

In each Comparative Example, 40 parts of the resin obtained in the corresponding one of Referential Examples 4–6, 100 parts of fine particulate synthetic amorphous silica (BET specific surface area: 300 m$^2$/g, product of Mizusawa Industrial Chemicals, Ltd.) and 0.2 part of a dispersant (sodium polypyrophosphate) were dispersed and mixed in a methyl ethyl ketone/toluene mixed solvent, and the solid content of the resulting dispersion was adjusted to 15%. Three coating formulations were therefore obtained for the formation of ink-receiving layers. Each coating formulation was applied by an air knife coater on a wood-free paper sheet having a basis weight of 35 g/m$^2$ to give a solid coat weight of 10 g/m$^2$, and was then dried. The thus-coated paper sheet was supercalendered under a linear pressure of 200 Kg/cm to form an ink-receiving layer. Three recording sheets were therefore obtained in Comparative Examples 1–3, respectively.

With respect to the six (6) recording sheets obtained as described above, ranking was made in the same manner as in the first aspect of the present invention. The ranking results are presented in Table 6.

TABLE 6

| Ranked properties | Example | | | Comparative Example | | |
|---|---|---|---|---|---|---|
|  | 1 | 2 | 3 | 1 | 2 | 3 |
| Ink absorbency | A | A | A | A | A | A |
| Vividness of produced color | A | A | A | A | A | A |
| Blotting resistance | A | A | A | A | A | A |
| Waterproofness of ink-receiving layer | A | A | A | B | B | B |
| Waterproofness of printed mark (wood-free paper sheet) | A | A | A | B | B | B |
| Blocking resistance | A | A | A | C | C | C |
| Printer transportability | A | A | A | C | C | C |
| Waterproofness of printed mark (PET film) | A | A | A | C | C | C |

As has been described above, the third aspect of the present invention provides an ink-jet recording sheet, which gives printed marks of high quality, is excellent in the waterproofness and moisture resistance of its ink-receiving layer and printed marks, and also is excellent in the transportability and blocking resistance in a printer.

As has been described above, the formation of an ink-receiving layer of an ink-jet recording sheet with any one of the above-described first to third resins, most preferably with a hydrophilic polyurethane resin, hydrophilic polyurea resin, hydrophilic polyurethane-polyurea resin or hydrophilic polyamide resin as a component makes it possible to provide a recording sheet which is excellent in ink absorbency and color-producing ability, gives stable printed marks of high quality, imparts superb waterproofness and moisture resistance to the ink-receiving layer and the printed marks, and is also excellent in the transportability and blocking resistance in a printer.

What is claimed is:

1. An ink-jet recording sheet provided with at least one ink-receiving layer on at least one side of a base material sheet, wherein said ink-receiving layer comprises a hydrophilic resin containing hydrolyzable silyl groups in a molecule thereof, and one or more components selected from the group consisting of inorganic and organic pigments, and resin particles, wherein said component imparts to said ink-receiving layer at least one of improved ink absorbency, dye fixability, blocking resistance and waterproofness.

2. An ink-jet recording sheet according to claim 1, wherein said hydrophilic resin is at least one resin selected from the group consisting of hydrophilic polyurethane resins, hydrophilic polyurea resins and hydrophilic polyurethane-polyurea resins.

3. An ink-jet recording sheet according to claim 1, wherein said hydrophilic resin has been crosslinked with water.

4. An ink-jet recording sheet according to claim 1, wherein said hydrophilic resin is a resin formed by using, as a portion of a raw material therefor, a compound with a reactive group and a hydrolyzable silyl group contained therein.

5. An ink-jet recording sheet according to claim 1, wherein said hydrophilic resin has a weight average molecular weight of from 5,000 to 500,000.

6. An ink-jet recording sheet according to claim 1, wherein said hydrophilic resin has a weight average molecular weight of from 10,000 to 200,000.

7. An ink-jet recording sheet according to claim 1, wherein said hydrophilic resin contains hydrolyzable silyl groups in a proportion of from 0.001 to 10.0 equivalents per gram.

8. An ink-jet recording sheet according to claim 1, wherein said hydrophilic resin contains hydrolyzable silyl groups in a proportion of from 0.01 to 1.0 equivalent per gram.

9. An ink-jet recording sheet provided with at least one ink-receiving layer on at least one side of a base material sheet, wherein said ink-receiving layer comprises a hydrophilic resin containing hydrolyzable silyl groups and tertiary amino groups in a molecule thereof.

10. An ink-jet recording sheet according to claim 9, wherein said hydrophilic resin is at least one resin selected from the group consisting of hydrophilic polyurethane resins, hydrophilic polyurea resins and hydrophilic polyurethane-polyurea resins.

11. An ink-jet recording sheet according to claim 9, wherein said hydrophilic resin has been crosslinked with water.

12. An ink-jet recording sheet according to claim 9, wherein said hydrophilic resin is a resin formed by using, as portions of a raw material therefor, a compound with a hydrolyzable silyl group contained therein and a compound with a tertiary amino group contained therein.

13. An ink-jet-recording sheet according to claim 9, wherein said hydrophilic resin has a weight average molecular weight of from 5,000 to 500,000.

14. An ink-jet recording sheet according to claim 9, wherein said hydrophilic resin has a weight average molecular weight of from 10,000 to 200,000.

15. An ink-jet recording sheet according to claim 9, wherein said hydrophilic resin contains hydrolyzable silyl groups in a proportion of from 0.001 to 10.0 equivalents per gram and tertiary amino groups in a proportion of from 0.1 to 50 equivalents per gram.

16. An ink-jet recording sheet according to claim 9, wherein said hydrophilic resin contains hydrolyzable silyl groups in a proportion of from 0.01 to 1.0 equivalent per gram and tertiary amino groups in a proportion of from 0.2 to 10.0 equivalents per gram.

17. An ink-jet recording sheet provided with at least one ink-receiving layer on at least one side of a base material sheet, wherein said ink-receiving layer comprises a hydrophilic resin containing hydrolyzable silyl groups, tertiary amino groups and polysiloxane segments in a molecule thereof.

18. An ink-jet recording sheet according to claim 17, wherein said hydrophilic resin is at least one resin selected from the group consisting of hydrophilic polyurethane resins, hydrophilic polyurea resins and hydrophilic polyurethane-polyurea resins.

19. An ink-jet recording sheet according to claim 17, wherein said hydrophilic resin has been crosslinked with water.

20. An-ink-jet recording sheet according to claim 17, wherein said hydrophilic resin has a weight average molecular weight of from 5,000 to 500,000.

21. An ink-jet recording sheet according to claim 17, wherein said hydrophilic resin has a weight average molecular weight of from 10,000 to 200,000.

22. An ink-jet recording sheet according to claim 17, wherein said hydrophilic resin contains hydrolyzable silyl groups in a proportion of from 0.001 to 10.0 equivalents per gram, tertiary amino groups in a proportion of from 0.1 to 50 equivalents per gram and polysiloxane segments in a proportion of from 0.1 to 10 wt. %.

23. An ink-jet recording sheet according to claim 17, wherein said hydrophilic resin contains hydrolyzable silyl groups in a proportion of from 0.01 to 1.0 equivalent per gram, tertiary amino groups in a proportion of from 0.2 to 10.0 equivalents per gram and polysiloxane segments in a proportion of from 0.5 to 10 wt. %.

24. An ink-jet recording sheet according to claim 1, 9 or 17, wherein said base material sheet is made of plastics, glass, fabric, leather, wood, metal or paper.

25. A coating formulation for the production of an ink-jet recording sheet, comprising a hydrophilic resin containing hydrolyzable silyl groups in a molecule thereof, a hydrophilic resin containing hydrolyzable silyl groups and tertiary amino groups in a molecule thereof, or a hydrophilic resin containing hydrolyzable silyl groups, tertiary amino groups and polysiloxane segments in a molecule thereof wherein the coating formulation also contains one or more components selected from the group consisting of inorganic and organic pigments, and resin particles, wherein said components impart to said ink-receiving layer at least one of improved ink absorbency, dye fixability, blocking resistance, and waterproofness.

* * * * *